March 18, 1941.                A. E. COLCHER                 2,235,144
                          RADIOGRAPHIC APPARATUS
                          Filed April 10, 1939              2 Sheets-Sheet 1

INVENTOR.
Abraham E. Colcher
BY
ATTORNEY.

March 18, 1941.  A. E. COLCHER  2,235,144
RADIOGRAPHIC APPARATUS
Filed April 10, 1939  2 Sheets-Sheet 2

INVENTOR.
Abraham E. Colcher
BY
*T. J. Nydick*
ATTORNEY.

Patented Mar. 18, 1941

2,235,144

UNITED STATES PATENT OFFICE 2,235,144

RADIOGRAPHIC APPARATUS

Abraham E. Colcher, Philadelphia, Pa.

Application April 10, 1939, Serial No. 267,018

5 Claims. (Cl. 250—61.5)

This invention relates to radiographic apparatus, and has particular reference to mechanisms for making radiographs of body sections by harmonious movements of the Roentgen-ray tube and the plate carrier.

The object of the present invention is to provide radiographic apparatus which will produce radiographs of any desired body section by associated movements of the Roentgen-ray tube and the plate wherein the speed of said tube and carrier is constant as to each.

A further object of the invention is to provide means for automatically reciprocating the tube in a rectilinear path.

A further object of the invention is to provide means for automatically reciprocating the tube in circular arcs of fixed radii.

A further object of the invention is to provide means for automatically reciprocating the tube in arcs of varying radii.

A still further object of the invention is to provide mechanisms which can be readily incorporated into new apparatus or which can be attached to apparatus now in use.

According to the invention the radiographic apparatus generally comprises, a table with slidable plate carrier beneath the surface thereof, an X-ray unit mounted to slide along side of the said table, and carrying a vertically moveable X-ray tube positioned to cast its rays on the table, means for reciprocating either the X-ray unit or the plate carrier, and connecting the X-ray tube arm and the plate carrier a lever associated with means for establishing a fulcrum point in the lever.

By adjustment of the latter means with the tube fixed against vertical motion it will reciprocate in a rectilinear path.

By release of the tube to allow for its vertical movement and the adjustment of the means associated with the lever to establish a fixed fulcrum, the X-ray tube will reciprocate in a circular arc.

By release of the tube to allow for its vertical movement and the adjustment of the means associated with the lever to allow it to slide through the fulcrum point while it is fixed at the plate carrier the tube will reciprocate in a symmetrical arc of varying radii.

The drawings illustrate an embodiment of the invention and the views therein are as follows.

Figure 1:
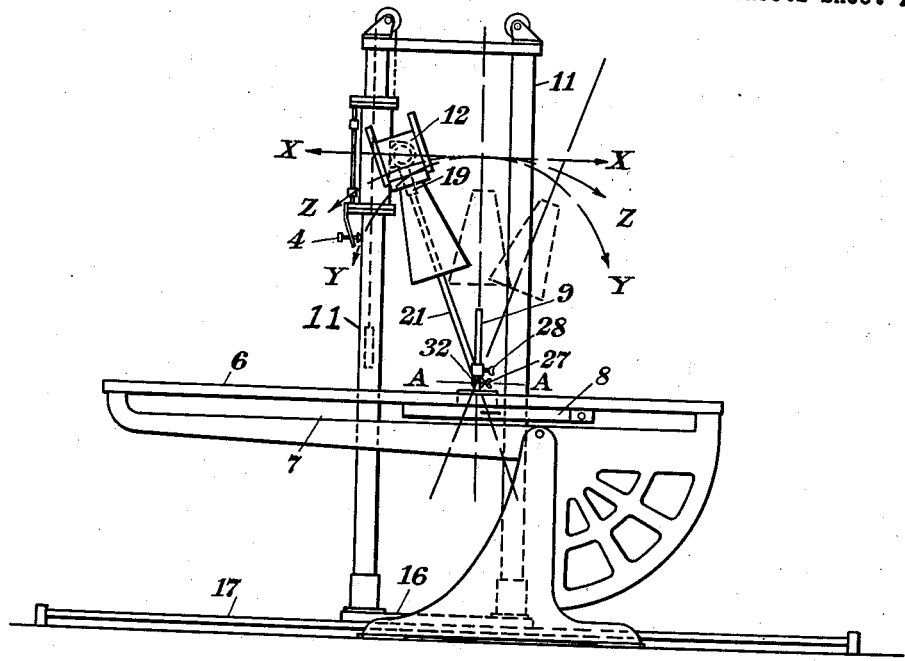
Figure 1 is a front view of a radiographic apparatus embodying my invention.
Figure 2:
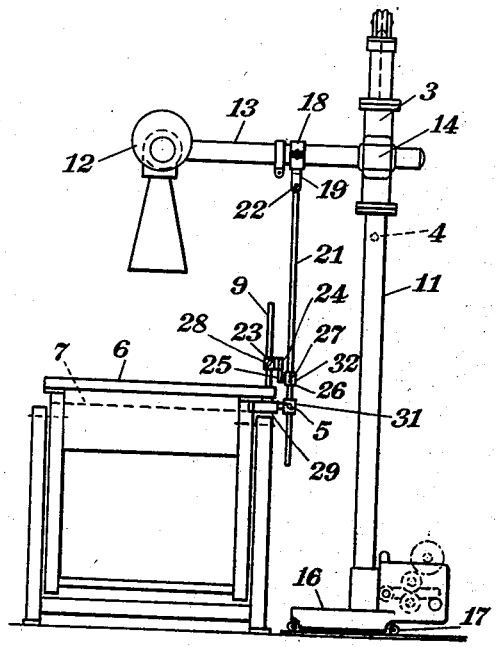
Figure 2 is an end view.

As illustrated in the drawings, the radiographic apparatus is provided with a table 6 upon which the patient may lie. This table is provided with a longitudinal recess or slot 7 which houses the plate carrier 8. Extending upward in a vertical direction from the table 6 and secured thereto at its lower end is the post 9.

The X-ray unit includes a Roentgen-ray tube 12 mounted on a tube arm 13. This arm is rotatably mounted in a socket 14 of a support 3 adjustably mounted on one of the vertical members 11 carried by the base member 16. The base member is slideably mounted on tracks or rails 17. The support 3 is provided with means, such as a set screw 4 for rigidly securing 3 to the vertical member.

The arm 13 has a collar 18 adjustably secured thereto, and provided with a depending member 19 for engagement of a lever 21. This member 19 may be provided with a set screw or other means 22 for fixedly securing the lever 21.

The upright post 9 on the table is provided with a bushing 23 which has a downwardly extending arm 24 provided with an oppositely extending bushing 26. This bushing 26 is pivotally mounted on the arm at 25, and is provided with a set screw or other means 27 for fixedly securing same to the lever 21 at point 32 intermediate its ends. The bushing 23 is also provided with a set screw or other means 28 for fixedly securing it to the upright post 9.

The plate carrier 8 has a centrally located arm 29 terminating in a bushing 31, which engages the lever 21 below point 32, and provides for the sliding of the lever through the same. Bushing 31 is also provided with a set screw or other means 5 which may be tightened against the lever, and thus become a pivotal point.

The base 16 is operably connected with means comprising a system of gears having reversing mechanism or a reversing motor or other appropriate means whereby the base can be uniformly reciprocated. The reciprocation mechanism is arranged so as adjustably to control the length and duration of the reciprocating stroke.

It is also possible by appropriate means primarily to reciprocate the plate carrier instead of the X-ray unit base 16. In such an arrangement, the apparatus is provided with means operably connected to the plate carrier and so arranged as to adjustably control the length and duration of the reciprocating stroke.

Figure 3:
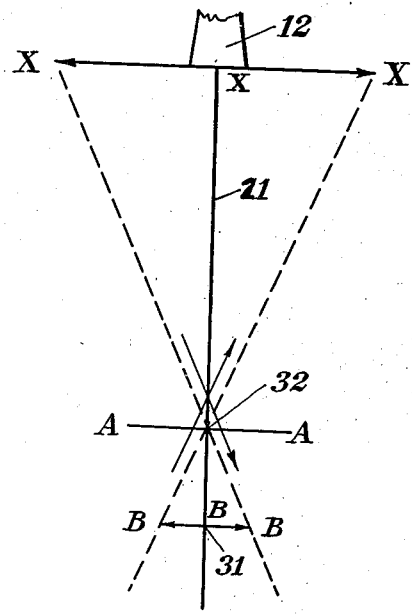
Figure 3 is a diagrammatic representation of the rays passing through a given focal point onto a section when the tube and plate are both reciprocated in rectilinear paths.
Figure 4:
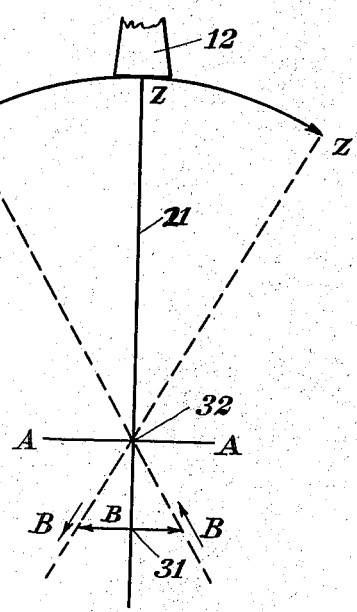
Figure 4 is a diagrammatic representation of the rays passing through a given focal point onto a section when the tube is reciprocated through a circular arc of fixed radius.
Figure 5:
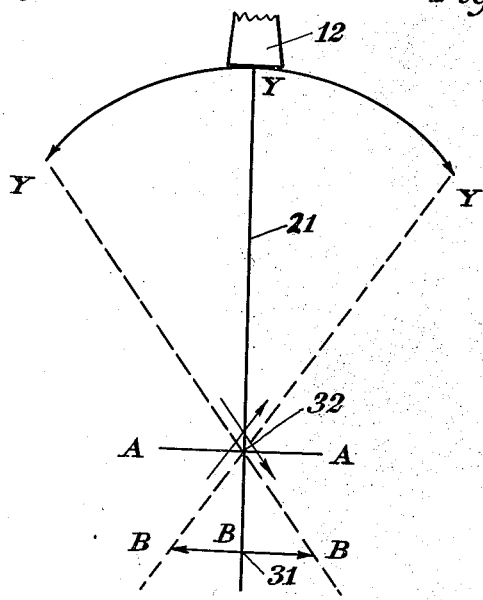
Figure 5 is a diagrammatic representation of the rays passing through a given focal point onto a section when the tube is reciprocated through a symmetrical arc of varying radii.

This novel apparatus is adapted to produce three different types of X-ray photographs of a selected body section in a plane, for example, A—A, as illustrated in Figures 3, 4 and 5. These different types are produced by three different types of reciprocating motion of the X-ray tube with a related and always rectilinear reciprocation of the plate carrier.

Type 1, rectilinear reciprocation of the tube and plate carrier, is illustrated in Figure 3. It is obtained by positioning the rotatable tube 12 at a selected elevation and tightening set screw 4 against vertical member 11. This prevents vertical motion of 12. Then the lever 21 connected with tube 13 is slidably engaged by bushing 26 at point 32 lying in the selected plane A—A. The position of point 32 is fixed by tightening set screw 28 of bushing 23 against the post 9. The lever is likewise slidably engaged by bushing 31 at plane B—B (the plane of the plate carrier).

When the X-ray unit is caused to reciprocate, the distance XA and AB will always increase in either direction from the vertical center line, and the central point on the target of the tube 12 and its corresponding point of projection B on the plate carrier will travel harmoniously with each other in the same rectilinear paths parallel to plane A—A.

The second type of motion of the tube 12, i. e., a circular arc is illustrated in Figure 4. This motion is obtained by positioning the rotatable tube arm 13 at a selected elevation with set screw 4 of the arm support 3 released, thus allowing the tube to move vertically. The lever 21 connected to the tube arm 13 is fixedly engaged in the bushing 26 by tightening set screw 27 at point 32 lying in the selected plane A—A. The position of point 32 is fixed by tightening set screw 28 of bushing 23 against the post 9. The lower end of the lever is slidably engaged by bushing 31 at plane B—B (the plane of the plate carrier).

When the X-ray unit is caused to reciprocate, the distance ZA will be constant, while AB will increase in either direction from the vertical center line, and the target of tube 12 will trace a circular arc Z—Z of fixed radius ZA about an axis perpendicular to the plane of reciprocation, and the central point Z on the target and its corresponding point B, as projected on the plate carrier, will travel harmoniously with each other while B moves in a horizontal plane parallel to plane A—A.

The third type of motion of the tube 12, i. e., a symmetrical arc of varying radii, is illustrated in Figure 5. This motion is obtained by positioning the rotatable tube arm 13 at a selected elevation with set screw 4 of the arm support 3 released, thus allowing tube 12 to move vertically. The lever 21 connected to the tube arm 13 is slidably engaged in the bushing 26 by releasing set screw 27 at point 32 lying in the selected plane A—A. The position of point 32 is fixed by tightening set screw 28 of bushing 23 against the post 9. The lower end of the lever is pivotally engaged by bushing 31 at plane B—B (the plane of the plate carrier) by tightening set screws 5 of bushing 31 against the lever 21.

When the X-ray unit is caused to reciprocate then the distance YB will be constant, while both YA and AB will vary in length in either direction from the vertical center line, and the target of the tube 12 will trace a symmetrical arc of variable radius about an axis perpendicular to the plane of reciprocation, and the central point Y on the target and its corresponding point B, as projected on the plate carrier, will travel harmoniously with each other, while B moves in a plane parallel to plane A—A.

It will be apparent that the three different types of motion of the X-ray tube are controlled or determined by the relative and appropriate settings of means 4, 27 and 5 with respect to each other. Therefore, with the same relative settings of means 4, 27 and 5 corresponding motions of the tube 12 can be obtained by causing the plate carrier primarily to reciprocate uniformly through connection with an appropriate reciprocation mechanism.

Furthermore, the same results may be obtained by connecting the lever 21 directly with a reciprocating mechanism whereby said lever, rather than the X-ray unit or the plate carrier, can be caused primarily to move thereby obtaining movement of the tube and plate carrier in the paths hereinbefore described.

Although the foregoing describes a preferred embodiment of the invention, it will be obvious that it may be varied in details without departing from the spirit of the invention.

I claim:

1. Apparatus for making body section radiographs comprising in combination, a slidable X-ray tube unit, means for imparting rectilinear reciprocation thereto, a table with a slidable plate carrier and transmission means for imparting rectilinear motion to the plate carrier in unison with the X-ray tube unit; the said unit comprising a slidable base, a vertical member, an arm fixedly mounted on the vertical member, an X-ray tube support carried by said arm, and means for rotatably supporting said arm to enable oscillation about an axis perpendicular to the path of reciprocation of the unit; the aforesaid transmission means comprising a lever pivotally connected to the said oscillating tube arm and slidably connected to the plate carrier and an intermediate fulcrum about which said lever is slidably connected for oscillation.

2. Apparatus for making body section radiographs comprising in combination, a slidable X-ray tube unit, means for imparting rectilinear reciprocation thereto, a table with a slidable plate carrier and transmission means for imparting rectilinear motion to the plate carrier in unison with the X-ray tube unit; the said unit comprising a slidable base, a vertical member, an arm slidably mounted on the vertical member, an X-ray tube support carried by said arm, and means for rotatably supporting said arm to enable oscillation about an axis perpendicular to the path of reciprocation of the unit; the aforesaid transmission means comprising a lever pivotally connected to the said oscillating tube arm and pivotally connected to the plate carrier and an intermediate fulcrum about which said lever is slidably connected for oscillation.

3. Apparatus for making body section radiographs comprising in combination, a slidable X-ray tube unit, means for imparting rectilinear reciprocation thereto, a table with a slidable plate carrier and transmission means for imparting rectilinear motion to the plate carrier in unison with the X-ray tube unit; the said unit comprising a slidable base, a vertical member, an arm slidably mounted on the vertical member, an X-ray tube support carried by said arm, and means for rotatably supporting said arm to enable oscillation about an axis perpendicular to the path of reciprocation of the unit; the aforesaid transmission means comprising a lever pivotally connected to the said oscillating tube arm and slidably connected to the plate carrier and an intermediate fulcrum about which said lever is pivotally connected for oscillation.

4. Apparatus for making body section radiographs comprising in combination a system including, a slidable X-ray tube unit, a table with a slidable plate carrier, means linking the plate carrier and the X-ray tube unit; means for reciprocating said system; the said unit comprising a slidable base, a vertical member, an arm adjustably mounted on the vertical member, an X-ray tube support carried by said arm, and means for rotatably supporting said arm to enable oscillation about an axis perpendicular to the path of reciprocation of the unit; the aforesaid linking means comprising a lever connected to said tube arm and to the plate carrier and an intermediate fulcrum in which said lever is mounted for oscillation; and means for establishing the path of reciprocation of the X-ray tube, said means comprising releasable means adapted to lock the tube arm support at predetermined position on the vertical member, releasable means adapted to lock the lever in the intermediate fulcrum, and releasable means adapted to lock the lever in the plate carrier connection therefor.

5. Apparatus for making body section radiographs comprising in combination a system including, a slidable X-ray tube unit, a table with a slidable plate carrier, means linking the plate carrier and the X-ray tube unit; means for reciprocating said system; the said unit comprising a slidable base, a vertical member, an arm adjustably mounted on the vertical member, an X-ray tube support carried by said arm, and means for rotatably supporting said arm to enable oscillation about an axis perpendicular to the path of reciprocation of the unit; the aforesaid linking means comprising a lever connected to said tube arm and to the plate carrier and an intermediate fulcrum in which said lever is mounted for oscillation; and means for establishing the path of reciprocation of the X-ray tube, said means comprising, a releasable set screw adapted to lock the tube arm support at predetermined position on the vertical member, a releasable set screw adapted to lock the lever in the intermediate fulcrum, and a releasable set screw adapted to lock the lever in the plate carrier connection therefor.

ABRAHAM E. COLCHER.